H. A. HUGHES AND T. Y. BAKER.
SEXTANT.
APPLICATION FILED JAN. 6, 1919.
1,337,912.
Patented Apr. 20, 1920.
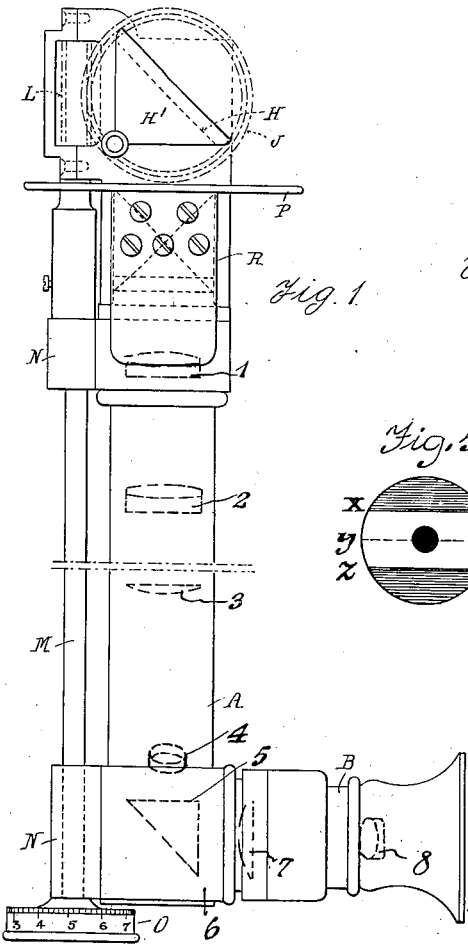
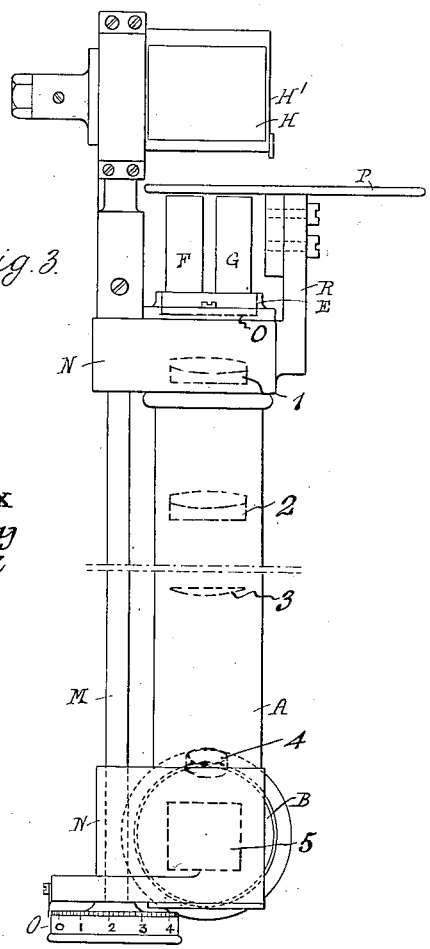
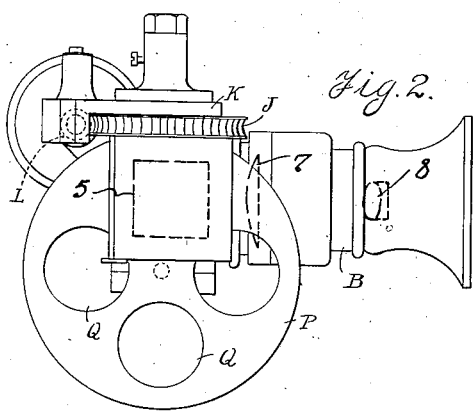
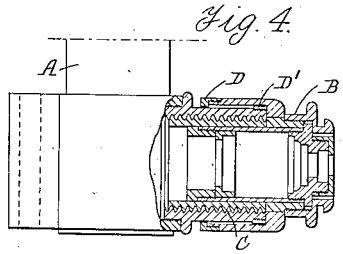
Inventors.
Henry A. Hughes and
Thomas Y. Baker.
by Wilkinson & Giusta.
Attorneys.

UNITED STATES PATENT OFFICE.

HENRY ALEXANDER HUGHES, OF LONDON, AND THOMAS YEOMANS BAKER, OF SLOUGH, ENGLAND.

SEXTANT.

1,337,912.  Specification of Letters Patent.  Patented Apr. 20, 1920.

Application filed January 6, 1919. Serial No. 269,812.

*To all whom it may concern:*

Be it known that we, HENRY ALEXANDER HUGHES, optician, of 59 Fenchurch street, in the city and county of London, England, and THOMAS YEOMANS BAKER, naval instructor, R. N., of Admiralty Compass Observatory, Slough, in the county of Buckingham, England, both subjects of the King of Great Britain, have invented a new and useful Improvement in Sextants, of which the following is a specification.

This invention relates to an improved sextant which is intended for use in aircraft or ships for determining the position by astronomical observation with reference to both the back and front horizons.

This invention relates to a sextant comprising a telescope and one relatively movable and two relatively fixed prisms or mirrors whereby three pencils of light reflecting an object overhead and the horizons at front and rear of the observer respectively can be observed at the same time.

The improved sextant may advantageously comprise a telescope sight that is of low power and large angular field of view and that has its optical axis vertical when in use, for which purpose it has a right angle bend in the eyepiece. Above the object glass of this optical system, two prisms of 45° angle are mounted in such a manner as to reflect a back and a front horizon which are both visible in the field of view, one erect and the other inverted. Between said prisms a clear aperture is left in order that an image of the sun or of a star may be reflected down the telescope tube by an index prism or mirror suitably mounted above the two horizon prisms.

The index mirror or prism is rotatable by gearing from the lower end of the telescope tube, the eyepiece of the telescope being focused by means of a screw. Moreover a series of shades is provided for darkening to any required extent the image of the sun or star to be observed.

In the accompanying drawings we have shown how our said invention may be conveniently and advantageously carried into practice. In these drawings:—

Figure 1 is a side elevation of a sextant constructed according to our invention;

Fig. 2 is a plan, and

Fig. 3 a side elevation looking in a direction at right angles to that of Fig. 1.

Fig. 4 is a detail view partly in section illustrating the adjustment of the eyepiece.

Fig. 5 is a view of what is seen by the observer in the eye piece of the telescope.

A is the main telescope tube, which is arranged vertically with the object glass at the top. This tube bears at its lower end an eyepiece B having its optical axis at right angles to that of the main tube. The body of the tube A is adapted to be held by the observer when the sextant is in use, thus doing away with the usual handle. The eyepiece B preferably has a graduated scale for setting it to the observer's focus and is focused by means of a screw C, its motion being limited by stops D, D'.

The optical system of the telescope as shown in dotted lines in Figs. 1 to 3, comprises an object glass 1, intermediate lenses 2, 3 and 4 in the vertical tube A; a reflecting prism 5 in the junction box 6, between the tubes A, B, and an intermediate lens 7, and eye lens 8 in the horizontal tube B.

Above the object glass of the telescope A, which preferably has a larger angular field than is usual, there is mounted in a frame E a horizontal glass plate O to the upper side of which two prisms F, G each of 45° angle are cemented so as to face in opposite directions. These prisms, which thus cannot be displaced relatively to one another, are adapted to reflect the front and the back horizon respectively into the same field of view, the image of one horizon being erect and that of the other horizon being inverted.

The prisms, F, G are arranged at a sufficient distance apart to permit of an image of the sun or of a star being reflected down the telescope tube A between them by an index-mirror H. If desired instead of arranging the prisms, F, G a short distance apart as shown, they may be arranged with their sides in contact, in which case a hole is formed centrally between the two prisms so as to allow light from the sun or a star to pass down along the optical axis of the telescope tube A.

The index-mirror H is mounted on a circular plate or disk J and is provided with a lateral screen plate H', to shut off extraneous light. The disk J is provided with a shaft rotatable in a bearing in a bracket K on the tube A. The disk J is also provided around its edge with teeth so as to form a worm-wheel for engaging with a worm L mounted on the end of a shaft M that is arranged to turn in bearings N, N parallel to the tube A and bears at its lower end a cylindrical head O having thereon a micrometer scale e. g. graduated to read in minutes. The spacing of the graduations on this scale corresponds with the pitch of the teeth on the disk J which is itself provided with a scale preferably divided to 100 units, the intermediate degrees and minutes being read off on the micrometer head O on the lower end of the worm-shaft M.

A circular frame P bearing a series of shades Q, Q is rotatably mounted on a bracket R on the tube A, so that the shades can be successively interposed between the prisms F, G and the index-mirror H, thus enabling the image of the sun or of the star observed to be darkened as required.

The view as seen by the observer through the sextant telescope is shown in Fig. 5. In this figure, X, X represents the back horizon, which is inverted, and Z, Z the front horizon which is the correct way up (alternately when the telescope is provided with an inverting eyepiece the back horizon will be erect and the front horizon inverted). If as is normally the case, the depression of the visible below the true horizon is the same in all azimuths, then the true horizon as seen by the observer must be in the position Y, Y and if he adjust the index mirror in such manner that the image of the sun bisects the space between the two horizons, he will be measuring the altitude of the sun's center above the true horizon. It will be seen that in this way the varying amount of the depression of the horizon due to change of height (the value of which in minutes of arc is approximately equal to the square root of the observer's height in feet) does not affect the accuracy of the observation except in so far as the ability of the observer to judge when the sun exactly bisects the space between two horizons is reduced when the horizons are widely separated. At the heights at which aircraft will fly it is possible to take an average value of the depression angle and so to arrange the prisms that the two visible horizons have a normal separation of from one to two sun's diameters.

What we claim as our invention and desire to secure by Letters Patent is:—

1. A sextant comprising a telescope of large aperture with a vertical optical axis, the eyepiece of which has a right angle bend and the object glass of which is arranged at the top, a pair of oppositely arranged prisms of 45° angle mounted on said telescope above the object glass, and an index-mirror rotatably mounted on said telescope above said prisms.

2. A sextant comprising a telescope of large aperture with a vertical optical axis, the eyepiece of which has a right angle bend and the object glass of which is arranged at the top, a pair of oppositely arranged prisms of 45° angle mounted on said telescope above the object glass, an index-mirror rotatably mounted on said telescope above said prisms, and gearing for rotating the index-mirror from the lower end of the telescope-tube.

3. A sextant comprising a telescope of large aperture with a vertical optical axis, the eyepiece of which has a right angle bend and the object glass of which is arranged at the top, a pair of oppositely arranged prisms of 45° angle mounted on said telescope above the object glass, an index-mirror rotatably mounted on said telescope above said prisms, and screw gearing for focusing the eyepiece.

4. A sextant comprising a telescope of large aperture with a vertical optical axis, the eyepiece of which has a right angle bend and the object glass of which is arranged at the top, a pair of oppositely arranged prisms of 45° angle mounted on said telescope above the object glass, an index-mirror rotatably mounted on said telescope above said prisms, worm-gearing for rotating the index-mirror from the lower end of the telescope-tube and screw gearing for focusing the eye-piece.

5. A sextant comprising a telescope of large aperture with a vertical optical axis, the eyepiece of which has a right angle bend and the object glass of which is arranged at the top, a pair of oppositely arranged prisms of 45° angle mounted on said telescope above the object glass, an index-mirror rotatably mounted on said telescope above said prisms, gearing for rotating the index-mirror from the lower end of the telescope-tube, and a frame bearing a series of shades rotatably mounted between the index-mirror and the oppositely arranged prisms.

6. A sextant comprising a telescope of large aperture with a vertical optical axis, the eyepiece of which has a right angle bend and the object glass of which is arranged at the top, a pair of oppositely arranged prisms of 45° angle mounted on said telescope above the object glass, an index-mirror rotatably mounted on said telescope above said prisms, gearing for rotating the index-mirror from the lower end of the telescope tube, a frame bearing a series of shades rotatably mounted between the index-mirror and the oppositely arranged prisms and screw gearing for focusing the eyepiece.

HENRY ALEXANDER HUGHES.
THOMAS YEOMANS BAKER.